R. L. TEDESCO.
DISPLAY APPARATUS.
APPLICATION FILED JULY 17, 1919.

1,369,060.

Patented Feb. 22, 1921.

Inventor
Ralph L. Tedesco,
By his Attorney
Clyde L. Rogers

R. L. TEDESCO.
DISPLAY APPARATUS.
APPLICATION FILED JULY 17, 1919.
1,369,060.
Patented Feb. 22, 1921.
3 SHEETS—SHEET 2.
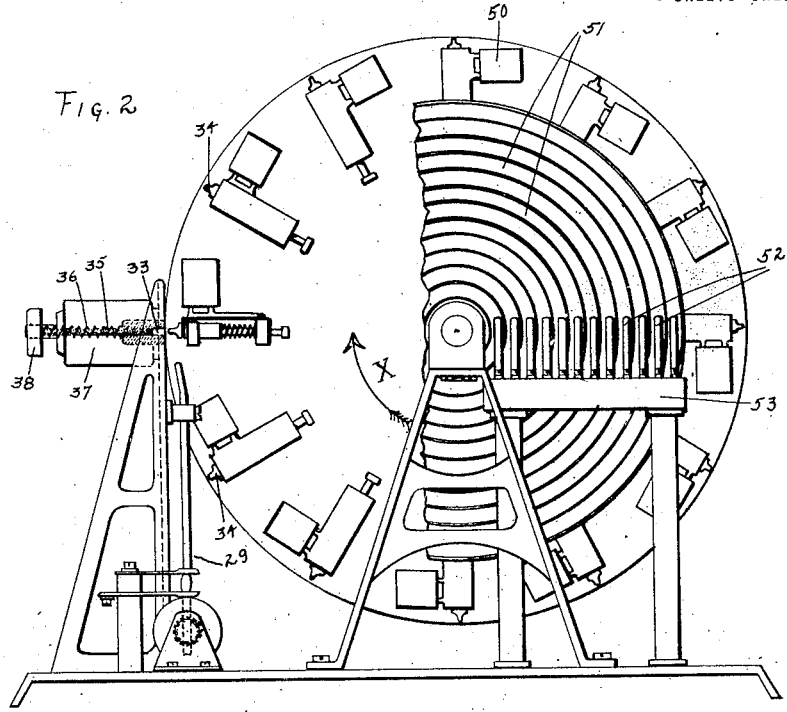
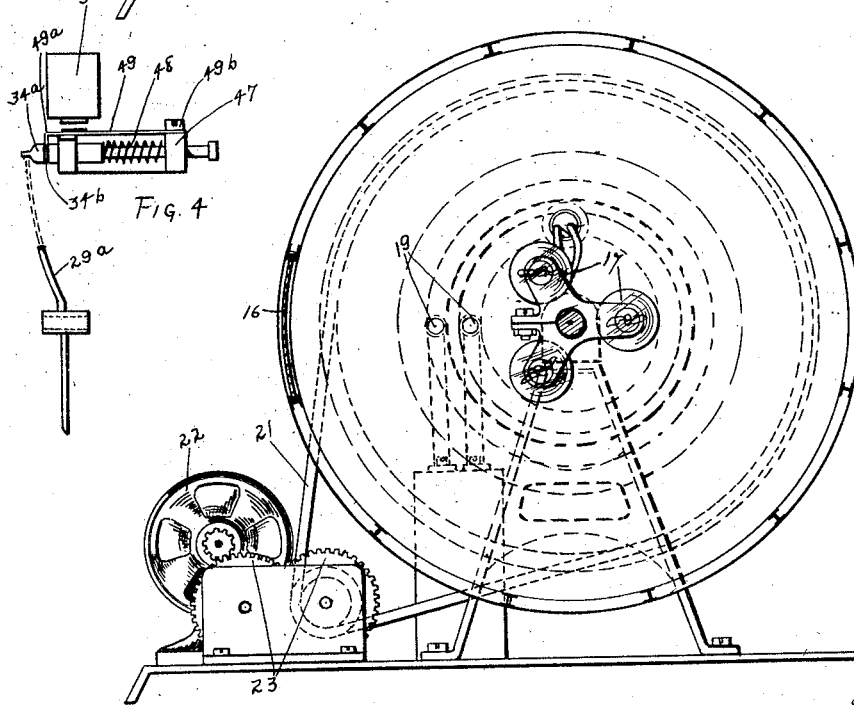
Inventor
Ralph L. Tedesco,
By his Attorney
Clyde L. Rogers R. L. TEDESCO.
DISPLAY APPARATUS.
APPLICATION FILED JULY 17, 1919.
1,369,060.
Patented Feb. 22, 1921.
3 SHEETS—SHEET 3.
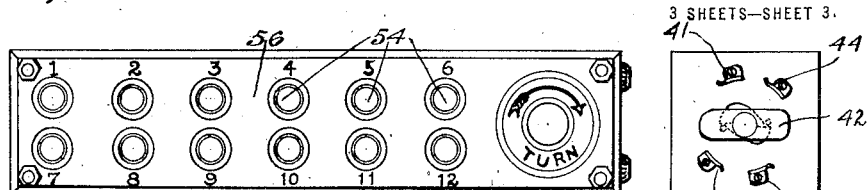
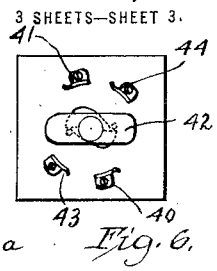
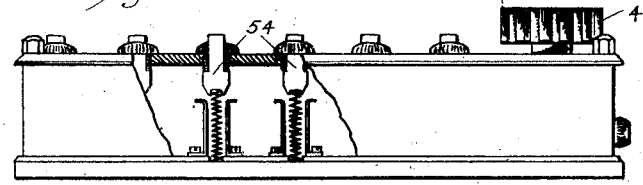
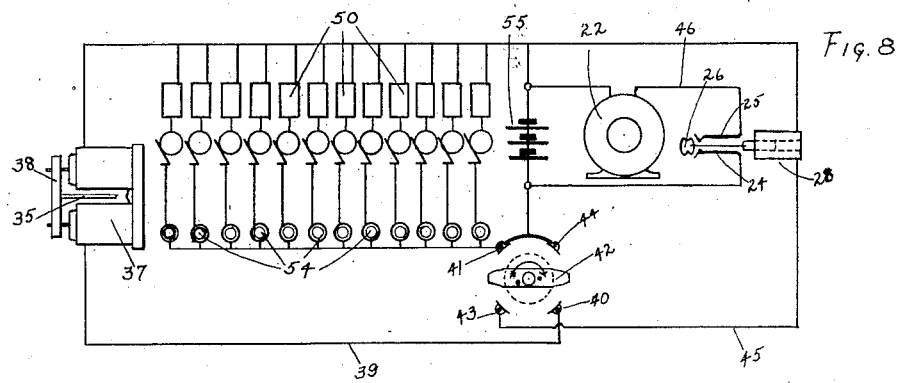
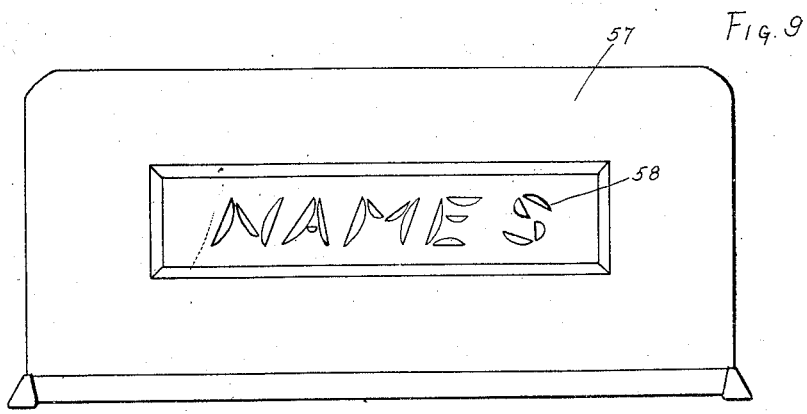

UNITED STATES PATENT OFFICE.

RALPH L. TEDESCO, OF ROCKLAND, MASSACHUSETTS.

DISPLAY APPARATUS.

1,369,060.  Specification of Letters Patent.  Patented Feb. 22, 1921.

Application filed July 17, 1919. Serial No. 311,453.

*To all whom it may concern:*

Be it known that I, RALPH L. TEDESCO, a citizen of the United States, and resident of Rockland, county of Plymouth, Commonwealth of Massachusetts, have invented an Improvement in Display Apparatus, of which the following description, in connection with the accompanying drawings, is a specification, like characters on the drawings representing like parts in each of the several views.

This invention relates to display apparatus adapted for automatic operation under the control of an operator for bringing selectively into view or exhibiting position any one of a series or set of announcements or other legends or indicia which it may be desired to present for informative, advertising, or other purposes. While having many other and more general fields of usefulness, one illustrative use for which the invention is well adapted, is for announcing selections as they are played in music demonstration rooms and the like. A principal object of the invention is to provide relatively simple yet reliable apparatus under the convenient and full control of the operator and requiring a minimum of attention on her part for making the desired announcements. The foregoing and other objects and advantages of the invention will more fully appear from the following detailed description, and the distinctive features of novelty will be pointed out in the appended claims.

Referring to the drawings:

Fig. 2 is an end view looking from the right in Fig. 1 and with parts broken away;

Fig. 3 is a transverse section on line 3—3 of Fig. 1 looking in the direction of the arrow A;

Fig. 4 is a fragmentary elevation illustrating one feature of the operation and control of the apparatus;

Fig. 5 is an elevation of an electric control button plate adapted for use with the invention;

Fig. 6 is a bottom plan view of a portion of the electric control contacts;

Fig. 7 is a side elevation of the contact control box;

Fig. 8 is a diagram showing the electric wiring; and

Fig. 9 is an elevation of a front facing adapted for use with the apparatus.

Figure 1:
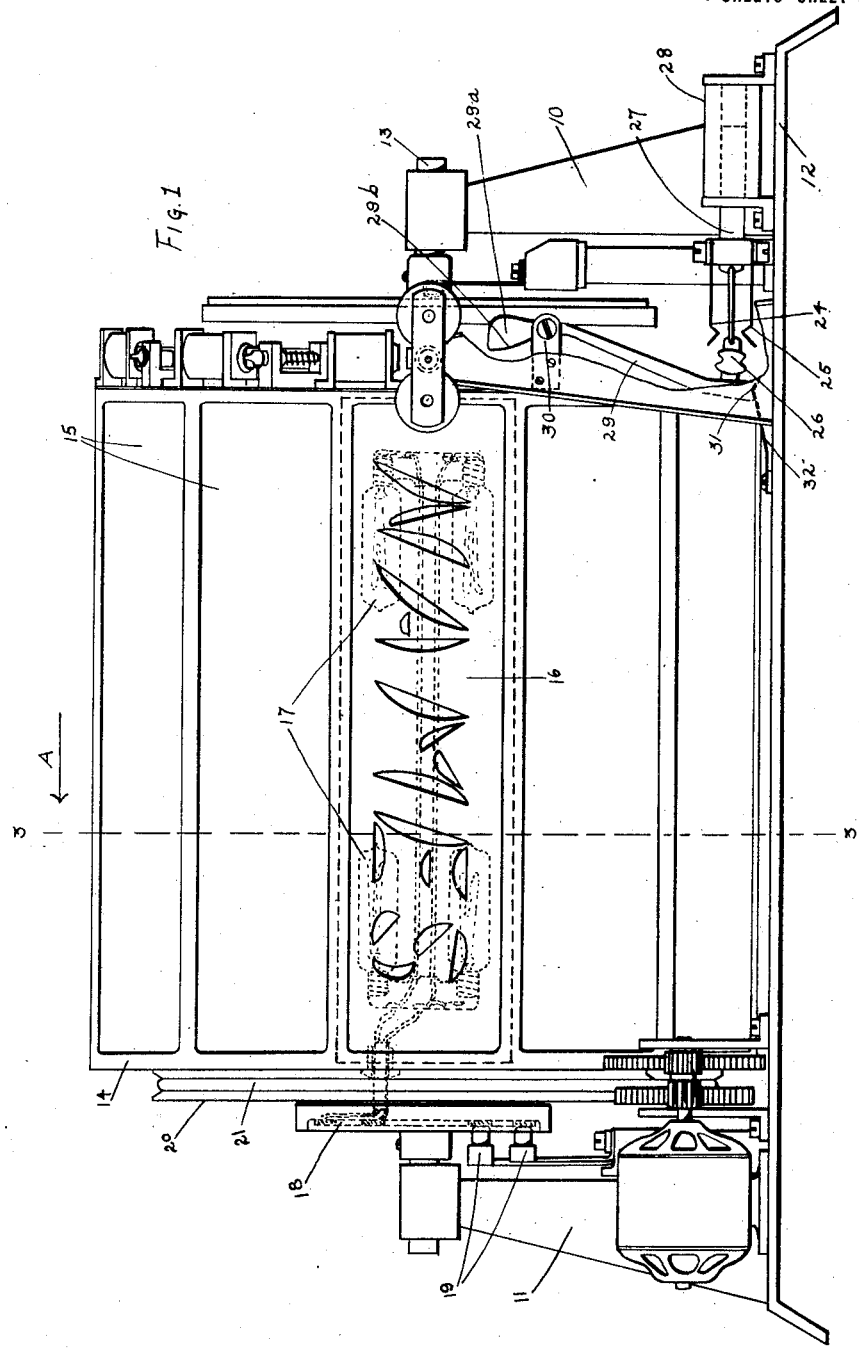
Figure 1 is a rear view of an apparatus embodying the invention with portions broken away to better show the interior construction.

Suitable spaced apart journal uprights 10, 11 are mounted on a base 12 and furnish bearings for the ends of a shaft 13 which extends therebetween. On this shaft is mounted to turn a drum 14 constituting a carrier for a series or set of announcement features or the like which may be the titles of a series of musical selections being demonstrated, or the successive numbers of an entertainment program. The drum 14 is provided with a series of exhibiting openings 15 spaced around the circumference thereof adapted to present successively to view at the front of the apparatus cards or plates 16 fitted in said openings and having stenciled or otherwise produced therein the announcement to be exhibited. Preferably the interior of the drum has mounted therein one or more electric lamps 17 adapted to project illumination outward through the stencil opening to render the same conspicuous. The electric current to supply these lamps may be furnished from a commutator ring 18 at the end of the apparatus supplied by brushes 19 in usual manner. For rotating the drum 14 it is shown as equipped with a belt wheel 20 driven by a belt 21 from an electric motor 22 through intermediate reducing gearing 23 mounted on the base 12. The circuit of the motor 22 includes in series a pair of spaced apart spring contacts 24, 25 which are adapted to be connected to complete the circuit by a bridging contact 26. This bridging contact is connected with a slidable core 27 of a solenoid 28 so arranged that upon energization of said solenoid the bridging contact 26 will be drawn inward and engaged with the spring contacts 24, 25. The bridging contact 26 is also engaged with the lower end of a relatively long lever arm 29 which is pivoted to the frame work at 30 and has a relatively short upper arm 29ª thereof formed with an inclined edge 29ᵇ adapted to be engaged by a member carried by the drum as presently described for retracting the bridging contact 26 from engagement with the spring contacts 24, 25 to break the motor circuit. The lower extremity of the lever arm 29 is provided with a beveled notch 31 engageable by a spring plate 32 to yieldingly hold said lever arm in position to keep the bridging contact 26 retracted. For normally locking the drum 14 stationary while the motor 22 is energized, a fixed socket 33 is provided into which a selective one of a series of spring pressed locking pins 34 carried by and spaced around the end of the drum 14, is adapted to engage and hold the drum immovable. When it is desired to start the drum it is necessary that this locking pin be retracted from the socket 33 and for this purpose I provide a pusher rod 35 adapted to eject said locking pin from said socket. This pin is normally held retracted out of said socket by a compression spring 36 engaging the same and it has associated therewith an electro-magnet 37, the armature 38 of which is engaged with said pusher rod so that when said magnet is energized the rod 35 is pressed inward to eject the pin 34 from the socket 33. For controlling the magnet 37 I provide a circuit 39 having spaced apart contacts 40, 41 adapted to be bridged by a contact bar 42 which is actuated by a button $42^a$. The contact bar 42 which normally occupies a position as shown in Fig. 8 is adapted upon movement in the direction of the arrow to first close the contacts 40, 41 to energize the magnet 37 and by a further movement to close the contacts 43, 44 which completes the motor controlling circuit 45, this circuit including the solenoid 28. The energization of this solenoid bridges the contacts 24, 25 completing the circuit 46 of the motor 22. The spring pressed locking pins 34 serve also as means for disconnecting the motor circuit after a predetermined movement as now to be described. These pins correspond in number to the number of exhibiting openings 15 in the drum 14, these being shown as twelve in number. Each pin 34 is mounted to slide in a bracket holder 47 fixed to the end of the drum and it is acted on by a compression spring 48 tending constantly to press it outward into operative position. An enlarged head $34^a$ of the pin is equipped with a groove $34^b$ which is adapted to be engaged by a turned-in end $49^a$ of a spring arm 49, the inner end of which is fixed to the frame 47 as indicated at $49^b$. The spring arm 49 is equipped with an armature which is acted on by an electro-magnet 50 carried by the drum. The series of electro-magnets 50 associated with the respective pins 34 are each in circuit with one of a series of commutator or collector rings 51 mounted on the end of the drum, these rings being engaged by a series of brushes 52 mounted on a fixed support 53. The respective brushes 53 are connected with a series of contact buttons 54 in a corresponding series of circuit branches arranged in parallel and so that any one of them may be operated to complete the circuit from the battery 55 to energize the particular electro-magnet 50 associated therewith. It may now be understood that upon actuation of any selected one of the buttons 54, the pin 34 controlled thereby will be released to be pressed outward by the spring 48 upon the retraction of the locking spring member 49. Thereupon on turning of the button $42^a$ as described, the rod 35 will be first actuated to eject the locking pin 34 then in engagement with the socket 33 and a further turning movement of said button will connect the contacts 43, 44 energizing the solenoid 28 and thus closing the circuit to start the drum. The drum thereupon rotates in the direction of the arrow X in Fig. 2. As it nears its predetermined position the pin 34 that has previously been projected as described engages the inclined edge $29^b$ of the lever arm $29^a$ throwing out the bridging contact 26 and thus deënergizing the motor. The drum continues to revolve a short distance under the influence of momentum until the projected pin 34 reaches the socket 33 with which it engages stopping and locking the drum, the position of this socket being such with reference to the lever edge $29^b$ that the momentum of the drum will be substantially spent before said pin engages said socket. The series of contact buttons 54 are, as shown, carried by a plate 56 with numbered identifications for the respective ones thereof so that by reference to a key or chart the operator can at once determine which button to actuate for causing the drum to rotate a sufficient extent to exhibit any particular feature. The front of the apparatus may be equipped with a suitable facing 57 with a sight opening 58 so arranged as to show therethrough the particular feature or announcement then in position for exhibition at the front of the drum. Among the distinctive and important advantages of the invention is that of being able to operate and control the device from any convenient location which may be remote from the device, the system of control buttons 54 as described serving to control the local actuating circuit of the motor equally well wherever the box bearing such control buttons may be located. Thus the apparatus may be placed in a store window or other conspicuous location and the operator may control the movement thereof from any unseen or convenient point. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. Display apparatus, comprising a rotatable drum equipped to display selectively any one of a series of subjects borne thereby, an electric motor for operating said drum, a series of electrically controlled locking elements for stopping said drum at selective predetermined points, means for actuating said locking elements from a relatively remote point, a relatively fixed socket having an automatic ejector associated therewith for receiving said locking elements selectively as they are projected to operative position, and a disconnector for the circuit of said motor also equipped for actuation by said locking element when projected to operative position.

2. A display apparatus comprising a rotatable drum equipped to display selectively any one of a series of subjects borne thereby, an electric motor for operating said drum, a series of electrically controlled locking elements for stopping said drum at selective predetermined points, said locking elements equipped for actuation from a remote point, a relatively fixed socket having an automatic ejector associated therewith for receiving said locking elements selectively as they are projected to operative position, a solenoid control for the circuit of said motor equipped for energization from a remote point and a disconnector for the circuit of said motor equipped for actuation by a locking element when projected to operative position.

3. A display apparatus comprising a rotatable drum equipped to display selectively any one of a series of subjects borne thereby, means for rotating said drum, a series of locking elements for stopping said drum consisting in radially movable pins mounted on said drum and spring pressed outward, each pin equipped with a solenoid locking device having connections for actuation from a remote point and a relatively fixed seat adapted to engage with a projected pin and having an automatic ejector associated therewith arranged to press the pin positively out of said seat to permit starting of the drum.

In testimony whereof, I have signed my name to this specification.

RALPH L. TEDESCO.